United States Patent
Nyfelt

(10) Patent No.: US 7,028,884 B2
(45) Date of Patent: Apr. 18, 2006

(54) METHOD OF VERIFYING ID-PAPERS AND THE LIKE

(75) Inventor: Leif Nyfelt, Fjallet, Karlsund 1, Skovde (SE) 541 92

(73) Assignees: Leif Nyfelt, Skovde (SE); Jan Bengtsson, Askim (SE)

( * ) Notice: Subject to any disclaimer, the term of this patent is extended or adjusted under 35 U.S.C. 154(b) by 0 days.

(21) Appl. No.: 10/301,920

(22) Filed: Nov. 22, 2002

(65) Prior Publication Data

US 2003/0094486 A1    May 22, 2003

Related U.S. Application Data

(60) Provisional application No. 60/340,249, filed on Dec. 18, 2001.

(30) Foreign Application Priority Data

Nov. 22, 2001    (SE)    .................................... 0103894

(51) Int. Cl.
    *G06F 17/00*    (2006.01)
(52) U.S. Cl. ........................ 235/375; 235/380; 235/487
(58) Field of Classification Search ................ 235/375, 235/379, 380, 487, 468, 382, 454, 485; 705/44; 382/118, 124, 140, 305, 306; 713/176, 173, 713/170; 902/5, 28, 2
    See application file for complete search history.

(56) References Cited

U.S. PATENT DOCUMENTS

| | | | | |
|---|---|---|---|---|
| 4,663,518 A | * | 5/1987 | Borror et al. | ................ 235/487 |
| 4,754,487 A | * | 6/1988 | Newmuis | ..................... 382/118 |
| 4,822,990 A | * | 4/1989 | Tamada et al. | ............. 235/492 |
| 5,001,696 A | * | 3/1991 | Baldwin | ..................... 365/244 |
| 5,410,642 A | * | 4/1995 | Hakamatsuka et al. | .... 358/1.14 |
| 5,505,494 A | | 4/1996 | Belluci et al. | |
| 5,659,164 A | * | 8/1997 | Schmid et al. | ............. 235/375 |
| 5,668,874 A | * | 9/1997 | Kristol et al. | ............... 713/186 |
| 5,844,230 A | * | 12/1998 | Lalonde | ...................... 235/487 |
| 5,886,334 A | * | 3/1999 | D'Entremont et al. | ...... 235/380 |
| 5,926,555 A | * | 7/1999 | Ort et al. | ..................... 382/124 |
| 5,932,870 A | * | 8/1999 | Berson | ....................... 235/494 |
| 6,061,478 A | * | 5/2000 | Kanoh et al. | ............... 382/305 |
| 6,092,729 A | * | 7/2000 | Seo | ........................ 235/462.09 |
| 6,135,355 A | * | 10/2000 | Han et al. | .................... 235/493 |
| 6,141,438 A | * | 10/2000 | Blanchester | ................ 382/140 |
| 6,185,805 B1 | * | 2/2001 | Rosiere et al. | ................. 29/428 |
| 6,193,153 B1 | * | 2/2001 | Lambert | ..................... 235/380 |
| 6,219,439 B1 | * | 4/2001 | Burger | ....................... 382/115 |
| 6,220,515 B1 | * | 4/2001 | Bello | .......................... 235/487 |

(Continued)

FOREIGN PATENT DOCUMENTS

EP    0 719 220 B1    5/2000

*Primary Examiner*—Thien M. Le
*Assistant Examiner*—Edwyn Labaze
(74) *Attorney, Agent, or Firm*—Young & Thompson

(57) ABSTRACT

The present invention relates to a method of verifying ID-papers and the like, particularly a document (1) that includes a photograph of a person that supports the identity of said person, wherein subsequent to having provided the document with all necessary information, including a photograph of the bearer of the document, the authority or organisation issuing the document scans the information carried by the document and stores the information in a data base so that upon presentation of the document (1) the scanned replica can be retrieved (5) and compared with the presented document.

10 Claims, 1 Drawing Sheet

U.S. PATENT DOCUMENTS

| | | | |
|---|---|---|---|
| 6,263,121 B1 * | 7/2001 | Melen et al. | 382/305 |
| 6,268,788 B1 * | 7/2001 | Gray | 340/5.2 |
| 6,286,761 B1 * | 9/2001 | Wen | 235/468 |
| 6,335,799 B1 * | 1/2002 | Provost | 358/1.4 |
| 6,354,494 B1 * | 3/2002 | Marcus | 235/380 |
| 6,381,418 B1 * | 4/2002 | Spurr et al. | 396/310 |
| 6,394,358 B1 * | 5/2002 | Thaxton et al. | 235/494 |
| 6,426,806 B1 * | 7/2002 | Melen | 358/468 |
| 6,536,665 B1 * | 3/2003 | Ray et al. | 235/380 |
| 6,698,653 B1 * | 3/2004 | Diamond et al. | 235/375 |
| 2001/0004810 A1 * | 6/2001 | Tasaki | 40/1 |
| 2003/0173408 A1 * | 9/2003 | Mosher et al. | 235/492 |
| 2004/0050931 A1 * | 3/2004 | Ono et al. | 235/380 |

* cited by examiner

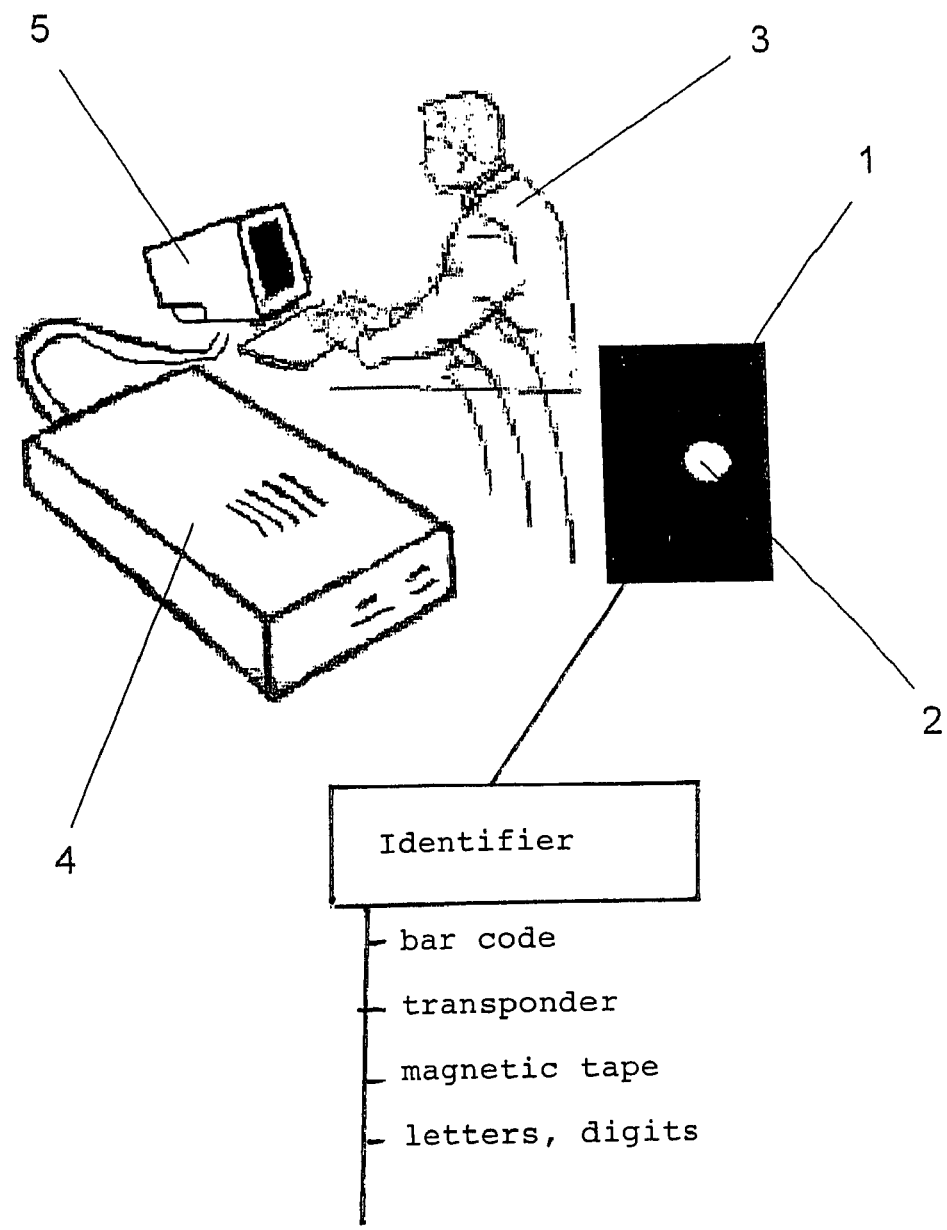

METHOD OF VERIFYING ID-PAPERS AND THE LIKE

BACKGROUND OF THE INVENTION

The present invention relates to a method of verifying ID-papers and the like with the purpose of establishing whether or not a presented paper or document is genuine, particularly a document that includes a photograph which supports the identity of the person presenting the document.

Forged ID-papers, passports, visas, and the like that permit people to enter countries, areas, buildings and the like are becoming an ever greater problem. Such ID-papers are normally issued in the form of a document that proves the identity of the person carrying the document and therewith legitimises his/her passage or provides proof of the person's identity in some other way. As mentioned, forged ID-papers are relatively commonplace throughout the world and it is more or less impossible for those checking such papers to ascertain whether or not they are genuine.

SUMMARY OF THE INVENTION

Accordingly, it is an object of the present invention to provide a method which enables the authenticity of an ID-paper, such as an ID-document, an ID-card, a passport, a visa, a pass card or an equivalent, to be verified more easily.

This object is achieved in accordance with the invention with a method in which after having provided an ID-paper with all necessary identification data, including a photograph of the bearer, the authority or organisation issuing the ID-paper scans the data/information on the ID-paper or document and stores this data/information in a data base, so that when the ID-paper is presented the replica scanned into the data base can be retrieved and compared with the presented ID-paper.

A further object of the invention is to provide an embodiment which enables the information stored in respect of the ID-paper to be retrieved from the data base automatically.

This further object of the invention is achieved by applying a machine-readable identification means on the ID-paper, so that the identity of the ID-paper can be read-in for simpler retrieval of the information on said replica stored in the data base.

Still another object of the invention is to enable the ID-paper to be marked so that the person responsible for verifying the ID-paper can readily see that the ID-paper is stored in its correct state in a data base in which the authenticity of the ID-paper can be checked.

The object is achieved by providing the ID-paper with a mark that cannot be removed without leaving a discernible trace on the paper.

BRIEF DESCRIPTION OF THE DRAWINGS

The invention will now be described in more detail with reference to a non-limiting embodiment illustrated in the accompanying drawing, which illustrates schematically the various elements used in accordance with the inventive method.

DESCRIPTION OF THE PREFERRED EMBODIMENTS

The invention is described initially with reference to an embodiment that concerns the verification of the authenticity of a passport. Passports are issued by police authorities or some equivalent body, where a high degree of precision is placed on the correctness of the information entered into/on the passport. The passport shall then function to confirm that the bearer of the passport is truly the person identified thereby. The issuing authority has the responsibility of checking that the information contained in the passport is correct, and that the photograph placed in the passport resembles the person to whom it is issued, at least at the time of issue. The bearer of the passport is then able to travel on the passport and it is expected that persons managing passport controls are able to ascertain that the person offering the passport is the same person as that presented in the photograph, and also whether or not the passport has been tampered with in some way.

Passports are forged in different ways. One way is to provide a stolen passport with a new photograph, so that the person shown on the new photograph assumes the identity of the proper owner of the passport. Another way is to substitute other information in a stolen passport with new information that better matches the bearer of the passport but gives the bearer a nationality that is different to his/her true nationality so that he or she can pass through a passport control to which he would otherwise be denied entry. Another variant of a forged passport is one where the document is a complete forgery from the outset and thus only externally resembles a correctly issued passport.

As before mentioned, it is difficult for the person examining a passport to distinguish a genuine passport from a forgery, particularly since the quality and the design of passports differ significantly from country to country, and even over the years in one and the same country.

In order to facilitate the verification of the authenticity of a passport, it has been proposed in accordance with the present invention that subsequent to having been placed in order, the passport is scanned so that the information contained in the passport, or ID-paper, can be stored in a data base as an exact copy or replica of the passport originally issued. When the passport is then checked at a passport control station, the information on the passport image stored in the data bank can be compared with the information on the document presented, in this case the passport.

Passports include a passport number, which may be used as the identification under which the information is stored in the data base. However, the passport is preferably given a specific ID-number and is stored under this number in the data base. This specific ID-number is applied to the passport so that the passport control officer is able to enter this number through his computer and check the information on the presented passport with the information stored in the data base. This specific ID-number will preferably have the form of a machine-readable identification carried by the passport, so that instead of needing to enter the number manually the passport control officer need only hold the passport in front of a reader which functions to read the number mechanically.

The accompanying drawing illustrates a passport 1 that includes machine readable identification 2. The passport is presented to the passport control officer 3 who holds the passport 1 in front of the reader 4, which reads the ID-number from the identification 2. The reader 4 is connected to the control officer's computer 5 which, in turn, is connected to a data base, or rather to a network of data bases in which copies or replicas of the passport are stored, wherewith the replica of the original passport scanned into the data base or data bases can be displayed on the screen of the control officer's computer 5 and the officer is able to determine readily whether the passport is authentic or not.

Naturally, the passport control officer must use his own judgement in determining whether or not the person shown in the replica is the person presenting the passport. He can be sure, however, that the passport presented is authentic when the replica scanned into the data base coincides with the presented document.

The identification 2 on the passport can be of different designs. For instance, it may have the form of a tag/transponder stuck firmly on or in the passport, so that the reader 3 will activate the tag/transponder when the passport is held in the vicinity of the reader, which will then receive the identification of the tag/transponder, this identification being the ID-number under which the replica of the passport 1 was stored in the data base. The identification can, of course, have a different form. For instance, it may have the form of a bar code that can be read by a bar code reader, a magnetic tape that can be read by a magnetic reader, or letter or digit combination that can be read by an optical reader.

It is suitable to apply the identification 2 to the passport so that it can be seen clearly, such that the passport control officer will be aware that he can readily verify the authenticity of the passport-with the aid of the identification 2. The identification 2 may be affixed on that page of the passport on which remaining identification data is entered and in a way which will ensure that a clear trace of the identification will be left if an attempt to remove the identification 2 is made.

The aforedescribed method is not restricted solely to the compilation of a new passport, but can also be applied with an existing passport presented to the issuing authority, which then applies the new identification to the passport and scans in the passport so that its replica can be stored in a data base together with corresponding information relating to newly issued passports.

It has become more common in recent times for different authorities, especially those that issue passports, to store information in mutually linked data bases, meaning that there is no difficulty in creating a function that covers the entire world in the present context.

As before mentioned, the invention is not limited to its application in respect of passports, but can be applied in many other areas where it is desired to verify the authenticity of a document. Such documents may consist of other types of identification papers used by authorities or companies. The invention can also be applied to other types of document with which positive verification may be of interest. These documents must be registered in a data base in a "safe" way, although it is normally unnecessary to place the same high security requirements on access in order to verify the genuineness of the document.

Should an attempt be made to replace an identification 2 applied to a document in accordance with the invention, the correct replica of the document will not be shown when attempting to verify the document. Either no replica will be shown at all or a completely different document will be shown if the identification has been taken from another document.

The invention claimed is:

1. A method of verifying authenticity of an identification document that includes a photograph of a person that supports an identity of the person, the method comprising the steps of:

an identification document issuing authority preparing an identification document by affixing thereto a photograph of a person whose identify is supported by the identification document and identification information for the person;

after the preparing step, the identification document issuing authority scanning the prepared identification document and storing in a database a scanned image of the prepared identification document that is a replica of the prepared identification document; and when the prepared identification document is presented in support of an identity of a person, retrieving the scanned image of the prepared identification document from the database and comparing the identification document presented in support of identity with the retrieved scanned image to verify an authenticity of the identification document presented in support of identity.

2. The method of claim 1, wherein the preparing step includes the step of applying to the identification document an identifier and wherein the retrieving step includes the step of retrieving the scanned image of the identification document by referring to the identifier.

3. The method of claim 2, wherein the identifier is machine readable.

4. The method of claim 3, wherein the identifier is a transponder.

5. The method of claim 3, wherein the identifier is a bar code.

6. The method of claim 3, wherein the identifier includes magnetically stored information.

7. The method of claim 3, wherein the identifier includes a letter and digit combination that is optically readable.

8. The method of claim 2, wherein the identifier includes a marking that cannot be removed without leaving its trace on the document.

9. The method of claim 1, wherein the storing step includes the step of the identification document issuing authority maintaining the database.

10. The method of claim 9, further comprising a step of linking the database maintained by the identification document issuing authority with other databases maintained by other identification document issuing authorities, and wherein the retrieving step comprises the step of accessing the linked databases.

* * * * *